(12) United States Patent
Kogiantis et al.

(10) Patent No.: US 11,658,755 B2
(45) Date of Patent: May 23, 2023

(54) INTERFERENCE MITIGATION IN MULTI-ANTENNA SYSTEM

(71) Applicant: Perspecta Labs Inc., Basking Ridge, NJ (US)

(72) Inventors: Achilles Kogiantis, Basking Ridge, NJ (US); Anthony Triolo, Basking Ridge, NJ (US); Eric Beck, Red Bank, NJ (US)

(73) Assignee: PERSPECTA LABS INC., Basking Ridge, NJ (US)

( * ) Notice: Subject to any disclaimer, the term of this patent is extended or adjusted under 35 U.S.C. 154(b) by 0 days.

(21) Appl. No.: 17/249,591

(22) Filed: Mar. 5, 2021

(65) Prior Publication Data

US 2022/0286216 A1    Sep. 8, 2022

(51) Int. Cl.
*H04B 17/345* (2015.01)
*H01Q 3/38* (2006.01)
*H04B 7/155* (2006.01)

(52) U.S. Cl.
CPC .......... *H04B 17/345* (2015.01); *H01Q 3/385* (2013.01); *H04B 7/15564* (2013.01)

(58) Field of Classification Search
CPC ... H04B 17/345; H04B 7/15564; H01Q 3/385
USPC ....................................................... 375/262
See application file for complete search history.

(56) References Cited

U.S. PATENT DOCUMENTS

| | | | |
|---|---|---|---|
| 5,303,240 A | 4/1994 | Borras et al. | |
| 5,844,522 A | 12/1998 | Sheffer et al. | |
| 6,339,697 B1 | 1/2002 | Ranta | |
| 6,377,802 B1 | 4/2002 | McKenna et al. | |
| 6,768,913 B1 | 7/2004 | Molnar et al. | |
| 6,963,745 B2 | 11/2005 | Singh et al. | |
| 7,058,401 B1 | 6/2006 | Sinivaara et al. | |
| 7,610,025 B2 | 10/2009 | Fernandez-Corbaton et al. | |
| 8,254,913 B2 | 8/2012 | Alcom | |
| 8,503,328 B2 | 8/2013 | Tian et al. | |
| 8,688,108 B2 | 4/2014 | Kaminski et al. | |
| 8,843,123 B1 | 9/2014 | Perets et al. | |
| 8,929,830 B2 | 1/2015 | Ludwig et al. | |
| 8,934,609 B2 | 1/2015 | Pan et al. | |
| 9,008,666 B1 | 4/2015 | Reeves et al. | |

(Continued)

OTHER PUBLICATIONS

Response to Non-Final Office Action; U.S. Appl. No. 17/249,590; filed Nov. 30, 2022; 24 pages.

*Primary Examiner* — Tanmay K Shah
(74) *Attorney, Agent, or Firm* — Heslin Rothenberg Farley & Mesiti PC; George S. Blasiak

(57) ABSTRACT

There is set forth herein, in one embodiment, receiving an aggregate scanning signal stream from a set of scanning antennas configured in a scanning configuration; receiving aggregate communication signal streams from first to Nth sets of communication antennas configured in respective communication configurations; identifying an interfering signal stream within the aggregate scanning signal stream and determining a direction associated to such interfering signal stream, wherein the identifying and determining are performed with use of processing of the aggregate scanning signal streams received from the scanning antennas configured in a scanning configuration; and returning an action decision responsively to the identifying and the determining.

20 Claims, 8 Drawing Sheets

(56) References Cited

U.S. PATENT DOCUMENTS

| | | |
|---|---|---|
| 9,107,134 B1 | 8/2015 | Belser et al. |
| 9,130,641 B2 * | 9/2015 | Mohebbi .............. H04B 7/2606 |
| 9,130,644 B2 | 9/2015 | Jayasinha |
| 9,392,512 B2 | 7/2016 | Su |
| 9,554,307 B2 | 1/2017 | Chen |
| 9,686,653 B2 | 6/2017 | Pitcher |
| 9,813,969 B2 | 11/2017 | Axmon et al. |
| 9,843,380 B1 | 12/2017 | Mitchell |
| 9,954,598 B2 | 4/2018 | Astrom et al. |
| 10,454,533 B1 | 10/2019 | Kogiantis et al. |
| 10,547,373 B2 | 1/2020 | Axmon et al. |
| 10,813,029 B2 | 10/2020 | Triolo et al. |
| 10,945,196 B2 | 3/2021 | Tang |
| 11,240,773 B2 | 2/2022 | Marshall |
| 11,337,127 B2 | 5/2022 | Dudzinski et al. |
| 11,343,825 B2 | 5/2022 | Logothetis et al. |
| 11,431,401 B2 | 8/2022 | Ning |
| 2002/0137538 A1 | 9/2002 | Chen et al. |
| 2002/0173269 A1 | 11/2002 | Grayson et al. |
| 2003/0069043 A1 | 4/2003 | Chhaochharia et al. |
| 2004/0174298 A1 | 9/2004 | Eriksson |
| 2004/0248519 A1 | 12/2004 | Niemela |
| 2005/0143118 A1 | 6/2005 | Bernhardsson et al. |
| 2005/0276247 A1 | 12/2005 | Heiman et al. |
| 2006/0239238 A1 | 10/2006 | Fernandez-Corbaton et al. |
| 2008/0002626 A1 | 1/2008 | Yokoyama |
| 2008/0156524 A1 | 7/2008 | Jachim et al. |
| 2008/0162106 A1 | 7/2008 | Johnson et al. |
| 2008/0181180 A1 | 7/2008 | Karaoguz |
| 2008/0220771 A1 | 9/2008 | Agarwal et al. |
| 2009/0003475 A1 | 1/2009 | Erceg et al. |
| 2009/0125630 A1 | 5/2009 | Gogic |
| 2009/0137250 A1 | 5/2009 | Kurimoto et al. |
| 2009/0318153 A1 | 12/2009 | Maheshwari et al. |
| 2010/0008244 A1 | 1/2010 | Sampath et al. |
| 2010/0234024 A1 | 9/2010 | McGuffin |
| 2010/0291931 A1 | 11/2010 | Suemitsu et al. |
| 2010/0298001 A1 | 11/2010 | Dimou et al. |
| 2011/0002371 A1 | 1/2011 | Forenza et al. |
| 2011/0039561 A1 | 2/2011 | Narasimha et al. |
| 2011/0039569 A1 | 2/2011 | Narasimha et al. |
| 2011/0070841 A1 | 3/2011 | Caulfield |
| 2011/0176479 A1 | 7/2011 | Booton et al. |
| 2012/0008593 A1 | 1/2012 | Randriamasy et al. |
| 2012/0064918 A1 | 3/2012 | Nakayasu |
| 2012/0081248 A1 | 4/2012 | Kennedy et al. |
| 2012/0224619 A1 | 9/2012 | Hashigaya |
| 2012/0289233 A1 | 11/2012 | Medbo et al. |
| 2012/0315915 A1 | 12/2012 | Ohm et al. |
| 2013/0143503 A1 | 6/2013 | Li et al. |
| 2013/0281080 A1 | 10/2013 | Carmon |
| 2014/0153498 A1 | 6/2014 | Rousu et al. |
| 2015/0117399 A1 | 4/2015 | Yang et al. |
| 2015/0119045 A1 | 4/2015 | Montgomery et al. |
| 2015/0181544 A1 | 6/2015 | Liu et al. |
| 2016/0047884 A1 | 2/2016 | Zhang et al. |
| 2016/0192153 A1 | 6/2016 | Namba et al. |
| 2017/0111771 A1 | 4/2017 | Hague et al. |
| 2017/0127332 A1 | 5/2017 | Axmon et al. |
| 2017/0171792 A1 | 6/2017 | Axmon et al. |
| 2017/0374707 A1 | 12/2017 | Dai et al. |
| 2018/0103351 A1 * | 4/2018 | Emmanuel .......... H04W 84/045 |
| 2019/0028950 A1 | 1/2019 | Triolo et al. |
| 2019/0049548 A1 * | 2/2019 | Miller ................. H04B 17/345 |
| 2019/0341811 A1 * | 11/2019 | Elliott ............... H02J 13/00028 |
| 2019/0394694 A1 | 12/2019 | Dent et al. |
| 2022/0286342 A1 | 9/2022 | Johnson et al. |

* cited by examiner

INTERFERENCE MITIGATION IN MULTI-ANTENNA SYSTEM

BACKGROUND

Various proposals have been made for increased data rates in radio frequency signal transmissions. A data rate of a radio link can be increased using multiple-input and multiple-output (MIMO) techniques. MIMO refers to a method for sending and receiving more than one data signal over a common radio channel using multipath propagation. MIMO has been incorporated into a variety of wireless communication standards including IEEE 802.11n (WiFi), WiMAX (4G) and Long-Term Evolution (LTE 4G).

Wireless communication systems include full duplex systems where communication can occur in a downlink transmission (i.e., transmission from the base station to the user device) and an uplink transmission (i.e., transmission from the user device to the base station) simultaneously. Full duplex systems can be either frequency division duplex (FDD) systems or time division duplex (TDD) systems. In a FDD system, the downlink and the uplink transmissions communicate over two separate frequency bands and associated center frequencies. Alternatively, in TDD systems, the downlink and uplink transmissions communicate over a single frequency band and associated center frequency. However, the uplink and downlink communications are separated in time. In a full duplex communication system, both the uplink signal and downlink signal must remain active. If either the uplink or downlink signal is lost for a significant period of time, the full duplex connection will fail.

BRIEF DESCRIPTION

There is set forth herein, in one embodiment, receiving an aggregate scanning signal stream from a set of scanning antennas configured in a scanning configuration; receiving aggregate communication signal streams from first to Nth sets of communication antennas configured in respective communication configurations; identifying an interfering signal stream within the aggregate scanning signal stream and determining a direction associated to such interfering signal stream, wherein the identifying and determining are performed with use of processing of the aggregate scanning signal streams received from the scanning antennas configured in a scanning configuration; and returning an action decision responsively to the identifying and the determining.

DRAWINGS

These and other features, aspects, and advantages set forth herein will become better understood when the following detailed description is read with reference to the accompanying drawings in which like characters represent like parts throughout the drawings, wherein.

DETAILED DESCRIPTION

Certain exemplary embodiments will now be described to provide an overall understanding of the principles of the structure, function, manufacture, and use of the methods, systems, and devices disclosed herein. One or more examples of these embodiments are illustrated in the accompanying drawings. Those skilled in the art will understand that the methods, systems, and devices specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Aspects of the present invention and certain features, advantages, and details thereof, are explained more fully below with reference to the non-limiting examples illustrated in the accompanying drawings. Descriptions of well-known materials, fabrication tools, processing techniques, etc., are omitted so as not to unnecessarily obscure the invention in detail. It should be understood, however, that the detailed description and the specific examples, while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1:
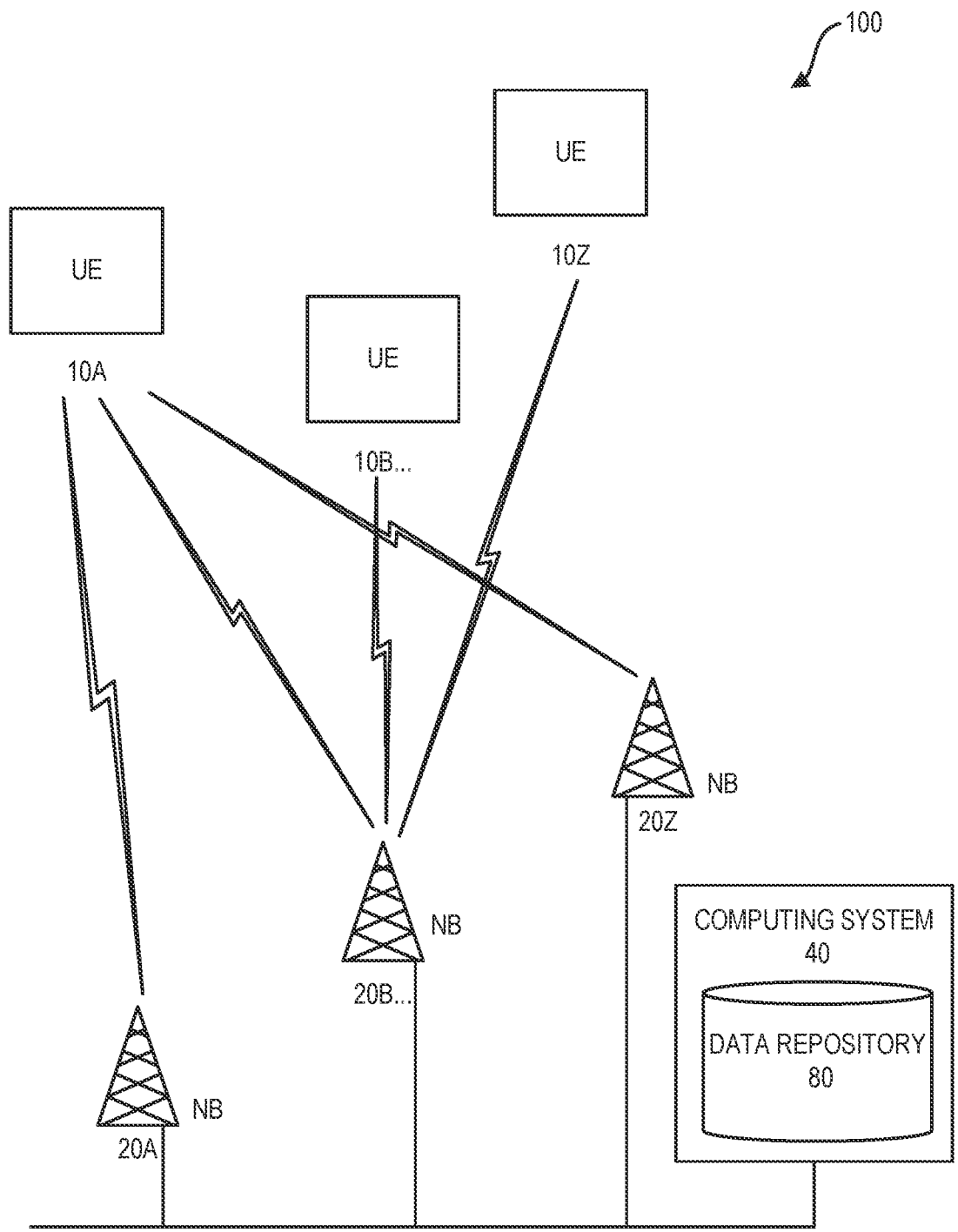
FIG. 1 is a schematic diagram depicting a radio communication environment according to one embodiment.

Radio communication environment 100 is shown in FIG. 1. Radio communication environment 100 can include user equipment (UE) devices 10A-10Z and a plurality of base stations 20A-20Z. A given UE device, e.g., UE device 10A, can be in communication range with a plurality of base stations, e.g., base station 20A, base station 20B and base station 20Z are shown in FIG. 1. A given base station e.g., base station 20B can be in communication range of a plurality of UE devices, e.g., UE device 10A, UE device 10B and UE device 10Z. Base stations 20A- 20Z and UE devices 10A-10Z operating within radio communication environment 100 can be generally referred to as communication nodes.

Embodiments herein recognize that within radio communication environment 100, any of base stations 20A-20Z and any of UE devices 10A-10Z can be susceptible to interfering signals. Interfering signals might be generated by an unauthorized entity such as an adversarial or malicious entity which is not authorized to communicate signals within radio communication environment 100.

Embodiments herein recognize that multiple input/multiple output (MIMO) and/or multiple input/single output (MISO) radio signal transmission schemes are useful for communication of radio signals in all radio frequency ranges, including in higher frequency e.g., above six gigahertz frequency range.

Embodiments herein set forth to mitigate a negative impact of interfering signals being generated by an unauthorized entity. An interfering signal, according to one scenario, can be a narrowband signal within a pickup range of a transceiver of an authorized communication node operating within radio communication environment 100. According to another scenario, an interfering signal can be a wideband signal, wider than a pickup range of an authorized communication node operating within radio communication environment 100.

Embodiments herein can include: receiving an aggregate scanning signal stream from a set of scanning antennas configured in a scanning configuration; receiving aggregate communication signal streams from first to Nth sets of communication antennas configured in respective communication configurations; identifying an interfering signal stream within the aggregate scanning signal stream and determining a direction associated to such interference signal stream, wherein the identifying and determining are performed with use of processing of the aggregate scanning signal streams received from the scanning set of scanning antennas configured in a scanning configuration; and returning an action decision responsively to the identifying and the determining.

Referring to radio communication environment 100 of FIG. 1, base station 20A can be in a first direction relative to UE device 10A, base station 20B can be in a second direction relative to UE device 10A, and base station 20Z can be in a third direction relative to UE device 10A. Thus, if one of base stations 20A, 20B or 20Z is being operated by an authorized entity that generates an interfering signal stream, UE device 10A can detect the interfering signal stream and perform responsive action, eliminating the identified interfering signal stream. Referring to base station 20B, UE device 10A can be in a first direction relative to base station 20B. UE device 10B can be a second direction relative to base station 20B, and UE device 10Z can be in a third direction relative to base station 20B. Base station 20B can be configured to detect any interfering signals that can be generated by one of UE devices 10A, 10B or 10Z and can perform a responsive action.

Figure 2:
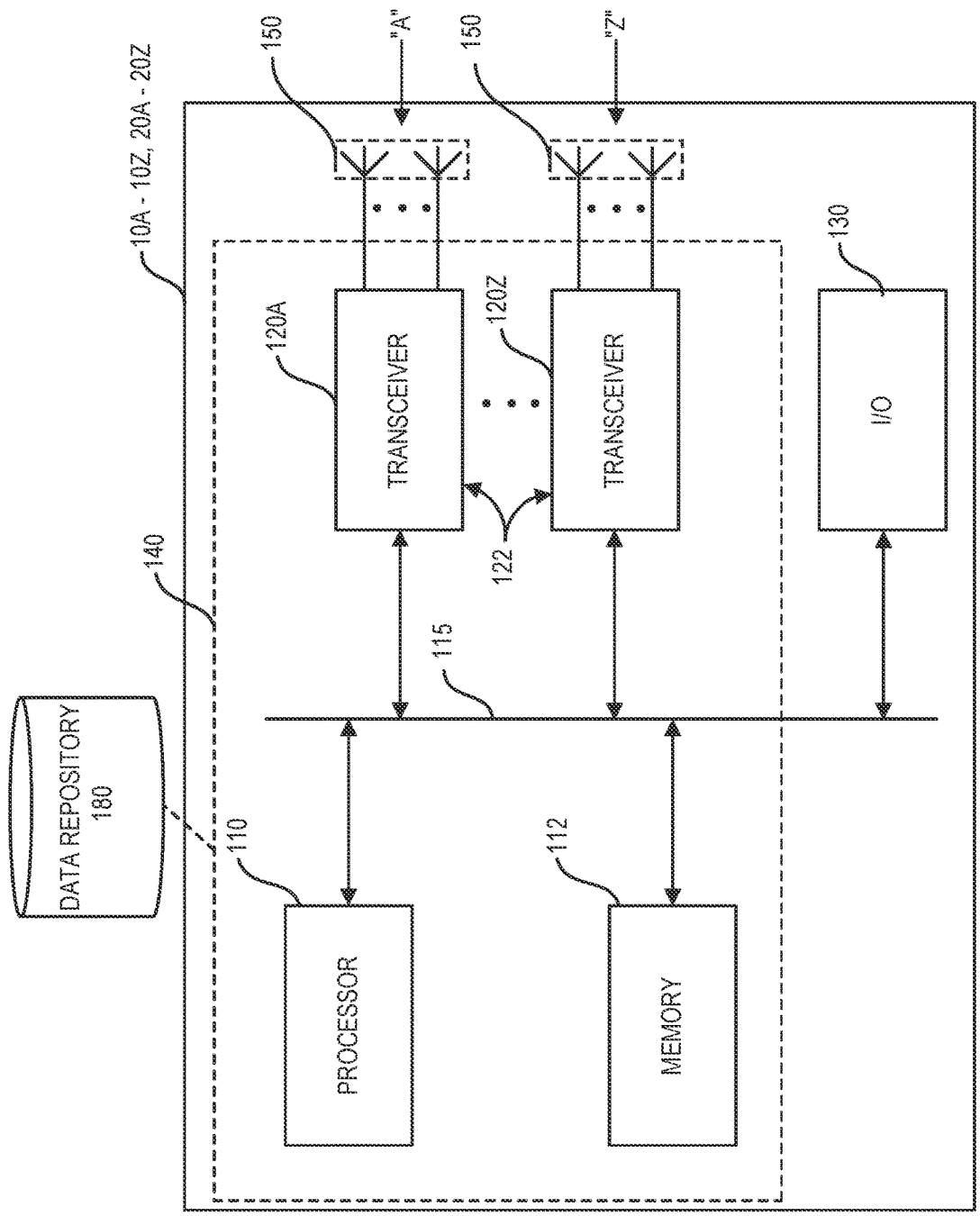
FIG. 2 is a functional block diagram of a communication node according to one embodiment.

FIG. 2 illustrates a communication node that can be configured as a UE device 10A-10Z or a base station 20A-20Z. The communication node of FIG. 2 can include one or more processor 110, and memory 112. Memory 112 can be provided by a system memory which can include volatile and nonvolatile memory. The communication node of FIG. 2 can also include one or more transceiver such as transceivers 120A-120Z and an additional one or more I/O device 130A. One or more additional I/O device 130A can include, e.g., one or more additional transceiver, one or more display, one or more wireline network interface, and the like.

Respective transceivers 120A-120Z can receive analog radio frequency signals from respective antenna arrays and can transmit analog radio frequency signals to respective antenna arrays for emission and by the respective antenna arrays. In the described embodiment of FIG. 2, radio transceiver 120A can be connected to and can receive signals from antenna array 150 at "A", and transceiver 120C can be connected to and can receive analog radio frequency signals from antenna array 150 at Z. Processor 110, memory 112, transceivers 120A-120Z, and one or more additional I/O device 130 can be in communication and can be connected to system bus 115, which can include a data bus, an address bus, and a control bus. Schematic diagram of a respective transceiver of transceivers 120A-120C is illustrated in reference to FIG. 3.

Figure 3:
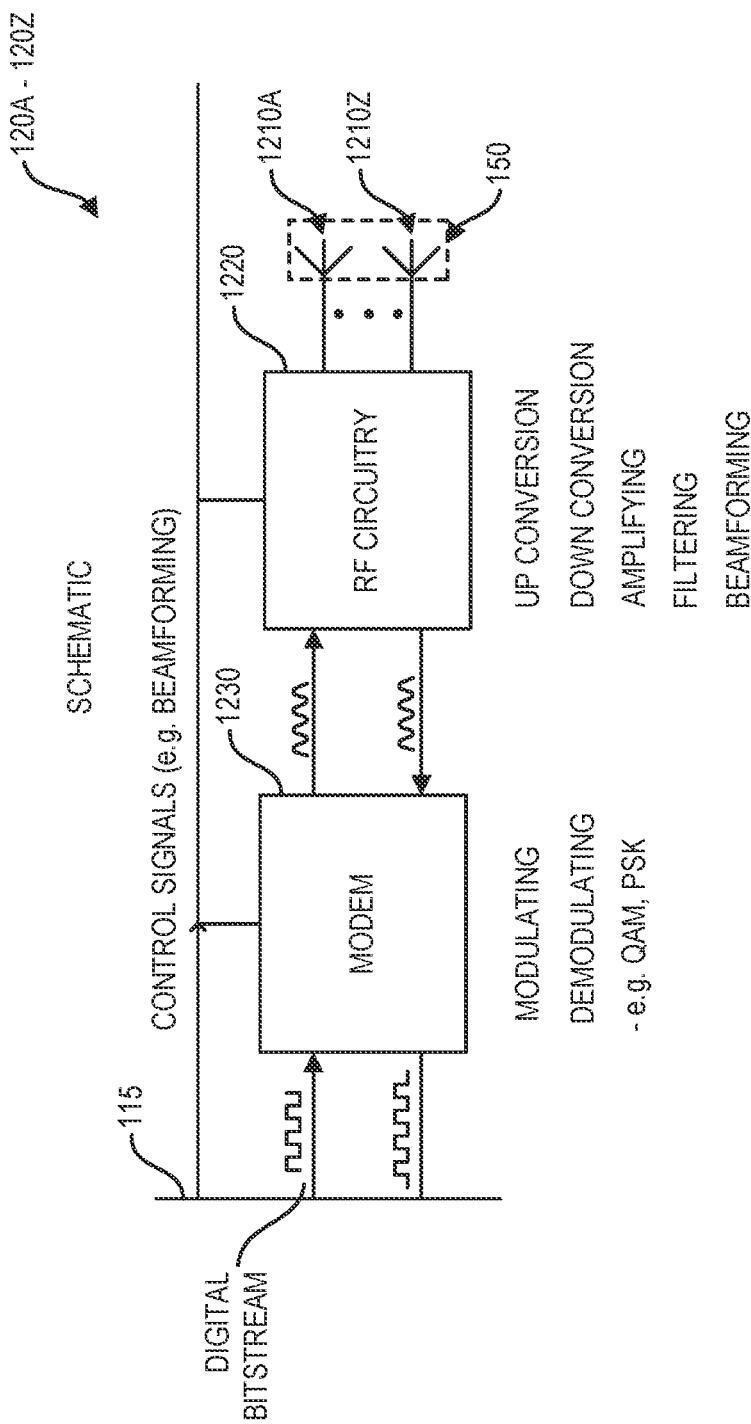
FIG. 3 is functional block diagram of a transceiver according to one embodiment.

Referring to the radio transceiver of FIG. 3, the depicted transceiver 120A-120Z can include modem 1230, RF circuitry 1220 and antenna array 150, including one or more antenna 1210A-1210Z. In operation, transceiver 120A-120Z for transmission of radio frequency signals can modulate a baseband frequency signal by modem 1230 using digital bitstream from system bus 115 so that the baseband signal generated within modem 1230 encodes the digital information of the digital bitstream received from system bus 115. Modem 1230 in turn can output a baseband frequency modulated signal to RF circuitry 1220. RF circuitry 1220 in turn can up-convert the modulated baseband frequency signal from modem 1230 and can perform further processing, such as amplifying and filtering the up-converted signal up- converted by RF circuitry 1210. RF circuitry 1220 can send an output signal to antenna array 150 for emission by antenna array 150.

For receiving a signal stream, RF circuitry 1220 can receive from antenna array 150 radio frequency signals that are picked up by antenna array 150 and can subject such received radio frequency signals to down-conversion, and other processing such as filtering, and can propagate the down-converted baseband received signal stream to modem 1230. Modem 1230 can demodulate the down-converted signal, down-converted to the baseband frequency. By demodulating the down-converted signal, modem 1230 can output a digital bitstream to system bus 115.

Modem 1230 can perform modulating and demodulating using modulation/demodulation schemes such as quadrature amplitude modulation (QAM) or phase shift keying (PSK). RF circuitry 1220 can perform such functions as up-conversion/down-conversion, amplifying, filtering and beamforming.

Figure 4:
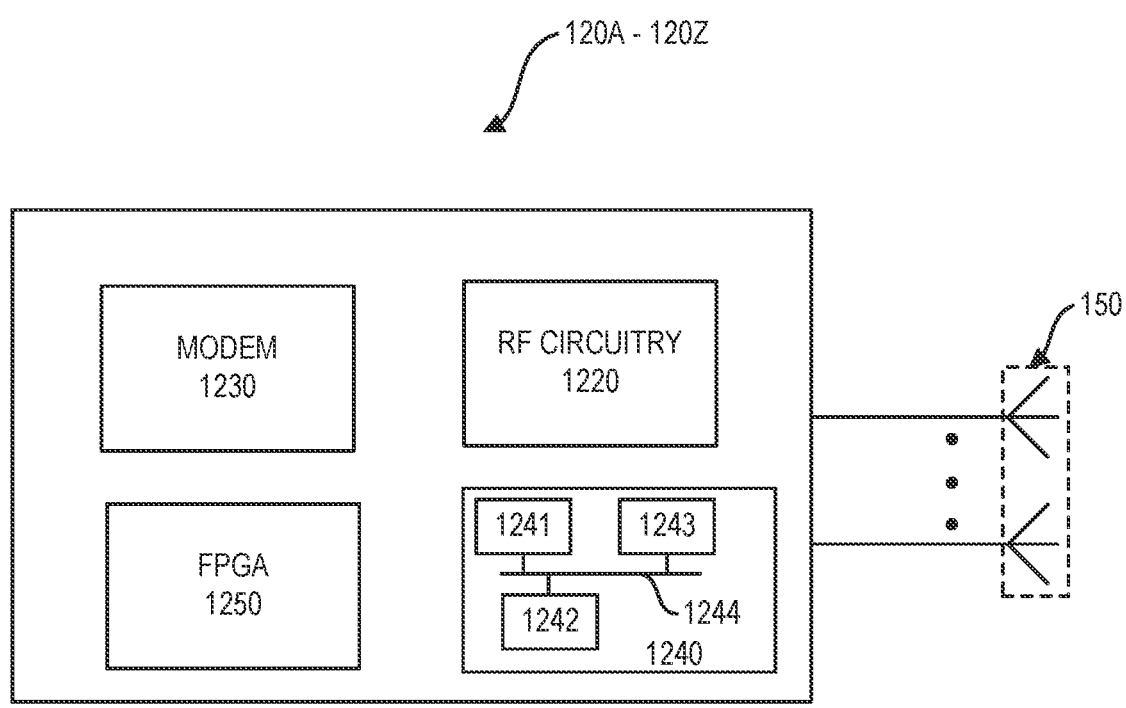
FIG. 4 is a functional block diagram of a transceiver according to one embodiment.

A functional schematic diagram of a respective transceiver of transceivers 120A-120Z is shown in FIG. 4. Transceiver 120A-120Z can include a modem 1230, RF circuitry 1220. Transceiver 120A-120Z can be connected to antenna array 150. Antenna array 150 can be connected to RF circuitry 1220 of transceiver 120A-120Z. Transceiver 120A-120Z can also include various circuitry permitting programmable control of the transceiver. According to one example, a respective transceiver of transceivers 120A-120Z can include computing node control circuitry 1240 and field programmable gate array (FPGA) control circuitry 1250.

Computing node control circuitry 1240 of a respective transceiver of transceivers 120A-120Z can include, e.g., one or more processor 1241 memory 1242 and one or more I/O device 1243 connected by system bus 1244. Control circuitry 1240 and/or control circuitry 1250 can be used to perform wide variety of control operations. Such operations can include, for example, performing of beamforming of different sets of antennas of antenna array 150, switching on signal transmission streams through one or more sets of antennas of antenna array 150, switching off received signal streams from one or more sets of antennas of antenna array 150, generating and adjusting local oscillator signals for performance of a conversion, generating and adjusting local oscillator signals for generating for control of down-conversion.

As indicated by FIG. 3, beamforming control signals and other control signals for control of modem of RF circuitry 1220, modem 1230, as well as control circuitry, such as computing node control circuitry 1240 and FPGA control circuitry 1250, can be received from system bus 115 shown in FIG. 2. The described control signal additionally or alternatively can be generated by transceiver 120A-120Z. Referring again to FIG. 2, signal processing operations of a communication node can be performed by signal processing circuit 140.

Signal processing circuit 140 of communication node 10A-10Z, 20A-20Z can include, e.g., in-combination processor, one or more processor 110, memory 112, and one or more transceiver 120A-120Z. Control functions can be performed by control circuitry of one or more transceiver 120A-120Z, such as computing node control circuitry 1240 and/or FPGA control circuitry 1250 as described in connection with FIG. 4 and/or can be performed by one or more processor 110 or, according to one embodiment, can be shared between one or more processor 110 and control circuitry of one or more transceiver.

Regarding beamforming functionality, signal processing circuit 140 can perform beamforming to control the direction of different sets of antennas. According to one embodiment as set forth herein, communication node 10A-10Z, 20A-20Z can include a scanning sets of antennas configured in a scanning configuration and first to Nth set of communication antennas configured in a communication configuration. The antenna set in a scanning configuration can have a wider beam angle the antenna sets on the communication configuration. In one general example, the scanning configuration antenna set can have a wide beam angle, e.g., about 2α degrees or more and communication configuration antenna sets can have narrow beam angles of from about α degrees or less. In one more specific example, the scanning configuration antenna set can have a wide beam angle, e.g., 40 degrees or more. Communication configuration antenna sets can have narrow beam angles of from about 1 degree or less (pencil beams) to about 20 degrees.

According to one embodiment, a beam angle and direction defined by a set of antennas of array 150 can be controlled by beamforming. More specifically according to one embodiment, where antenna array 150 is phase controlled antenna array controllable by beamforming, signal processing circuit 140 can control the configuration of a set of antennas of antenna array 150 to define scanning configuration or communication configuration with use of applying phase control beamforming control signals to a set of antennas of antenna array 150. Applied beamforming phase control signals can control a phase relationship between antennas so that a radiating beam angle and direction of a set of antennas are established at a desired angle and direction. According to one embodiment, signal processing circuit 140 can perform beamforming using RF circuitry 1220 of signal processing circuit 140. According to one embodiment, analog control signals for beam selection can be provided by RF circuitry 1220 of signal processing circuit 140. According to a hybrid beamforming embodiment, signal processing circuit 140 can provide a combination of analog and digital control signals for beam selection. According to one embodiment, transceiver 120A can control a direction of a set of antennas with use of motor control signals to control a mounting orientation of antenna array 150.

According to one embodiment, a communication node 10A-10Z, 20A-20Z can perform iteratively receiving of an aggregate scanning signal stream from a set of scanning antennas and can perform iteratively receiving aggregate communication signal streams from first to Nth sets of antennas. In the described scenario, the set of scanning antennas can be configured in a scanning configuration, and the first to Nth sets of antennas can be configured in a communication configuration. In a scanning configuration, a set of antennas can be optimized for count of received signal streams of external communication nodes. That is, in a scanning configuration, a set of antennas is able to pick up signal streams from an increased number of UE devices and/or base stations relative to the number of UE devices and/or base stations from which signal streams can be picked up in a communication configuration. In a communication configuration, a set of antennas can be optimized for communication performance, e.g., in terms of data rate (e.g., in terms of bits per second). An aggregate scanning signal stream from a set of scanning antennas can include a sum of signals from zero or more communication nodes (some of which may be unauthorized and generating an interfering signal) plus noise. An aggregate communication signal stream from a set of communication antennas can include a sum of signals from zero or more communication nodes (some of which may be unauthorized and generating an interfering signal).

In one embodiment, an antenna array 150 herein have refer to a grouping of commonly mounted antennas commonly mounted to the common mount structure such that movement of the mount structure commonly moves the antennas of the array. Antenna array 150 can be moveable between different mounting orientations. Transceiver circuitry 122 of a communication node 10A-10Z, 20A-20Z can be defined by one or more transceiver of transceivers 120A-120Z. According to one embodiment, a transceiver herein can refer to transceiver circuity 122 associated to a respective antenna array 150. In one illustrative embodiment, the different transceivers 120A-120Z of communication node can include respectively different instances of a commercial off the shelf (COTS) transceiver IC chip.

In one embodiment, transceiver circuitry 122 of a communication node 10A-10Z, 20A-20Z herein can be configured to define a different respective signal receive path associated to respective ones of scanning or communication antenna sets herein. For example, communication node 10A-10Z, 20A-20Z includes one scanning antenna set and first to Nth sets of communication antennas, there can be defined by the transceiver circuitry 122 one scanning signal receive path and first to Nth communication signal receive paths wherein each of the communication signal receive paths is associated to one communication antenna set.

Figure 5:
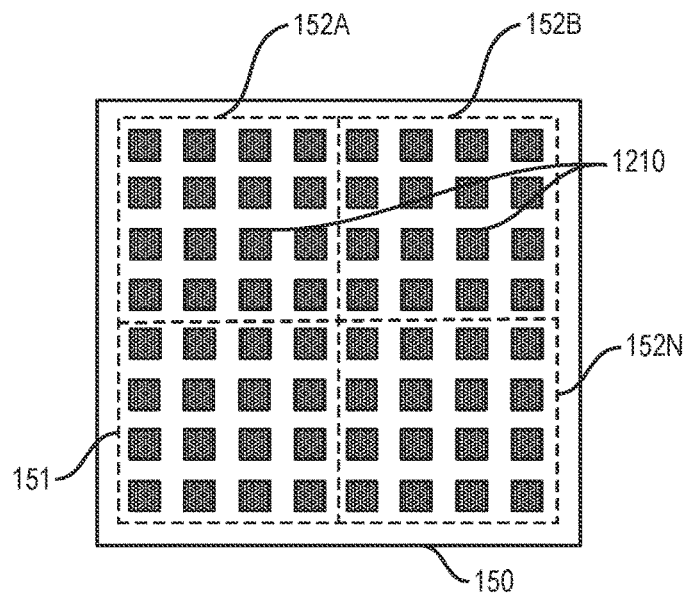
FIG. 5 is schematic diagram of communication node antenna array system according to one embodiment.

The described set of scanning antennas and the described first to Nth sets of communication antennas can be provided according to a number of different design schemes. As shown in FIG. 5, the communication node, e.g., a UE device 10A-10Z or a base station 20A-20Z, can include a single antenna array 150. The set of scanning antennas 151 of antenna array 150 can be configured in a scanning configuration and the first to Nth sets of antennas, namely antenna set 152A, antenna set 152B, and antenna set 152N can also be provided within antenna array 150, which is the single antenna array of a communication node in the embodiment of FIG. 5. In the embodiment of FIG. 5, the set of scanning antennas 151 configured in a scanning configuration and the first to Nth sets of communication antennas, namely the set of antennas 152A, set of antennas 152B, and set of antennas 152N, can be co-located on the depicted antenna array 150 with the set of scanning antennas 151.

Figure 6:
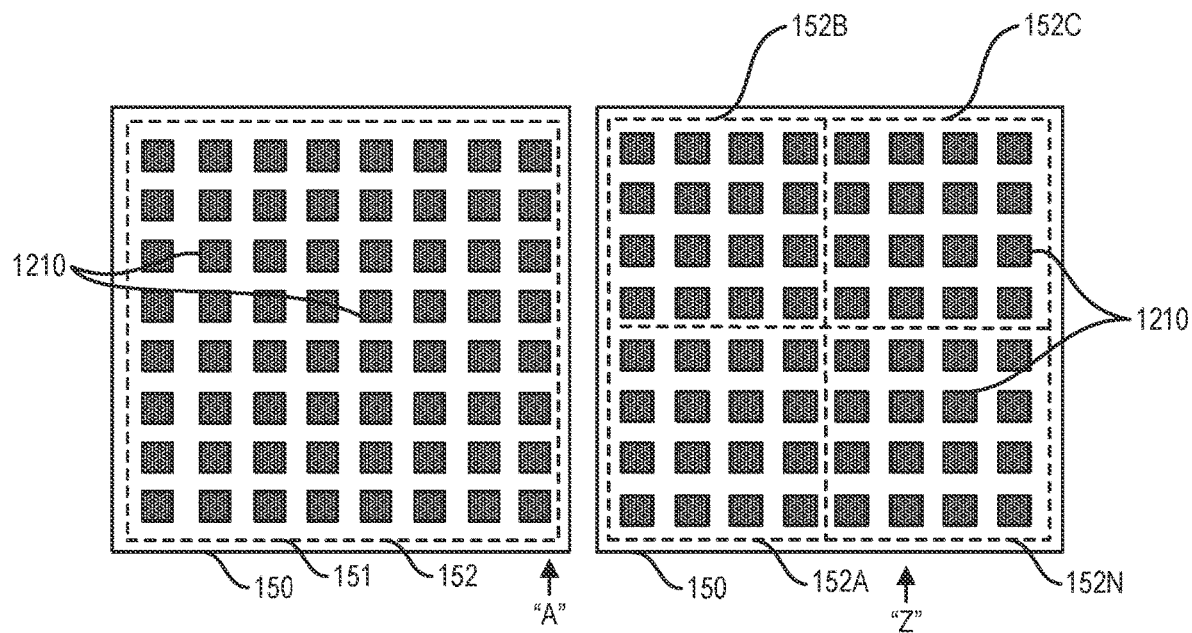
FIG. 6 is schematic diagram of communication node antenna array system according to one embodiment.

In the embodiment depicted in FIG. 6, a communication node, e.g., a UE device 10A-10Z or a base station 20A-20Z, can include a first antenna array 150 at location "A" and a second antenna array 150 at location "Z". The set of scanning antennas 151 configured in a scanning configuration can be disposed on antenna array 150 at location "A" and can be defined by the entirety of antennas of antenna array 150 at location "A". In the embodiment described with reference to FIG. 5, the first to Nth sets of communication antennas can each be provided on second antenna array 150 at location "Z". The first to Nth sets of communication antennas can include antenna set 152A, antenna set 152B, antenna set 152C, and antenna set 152N, as depicted in FIG. 6.

Figure 7:
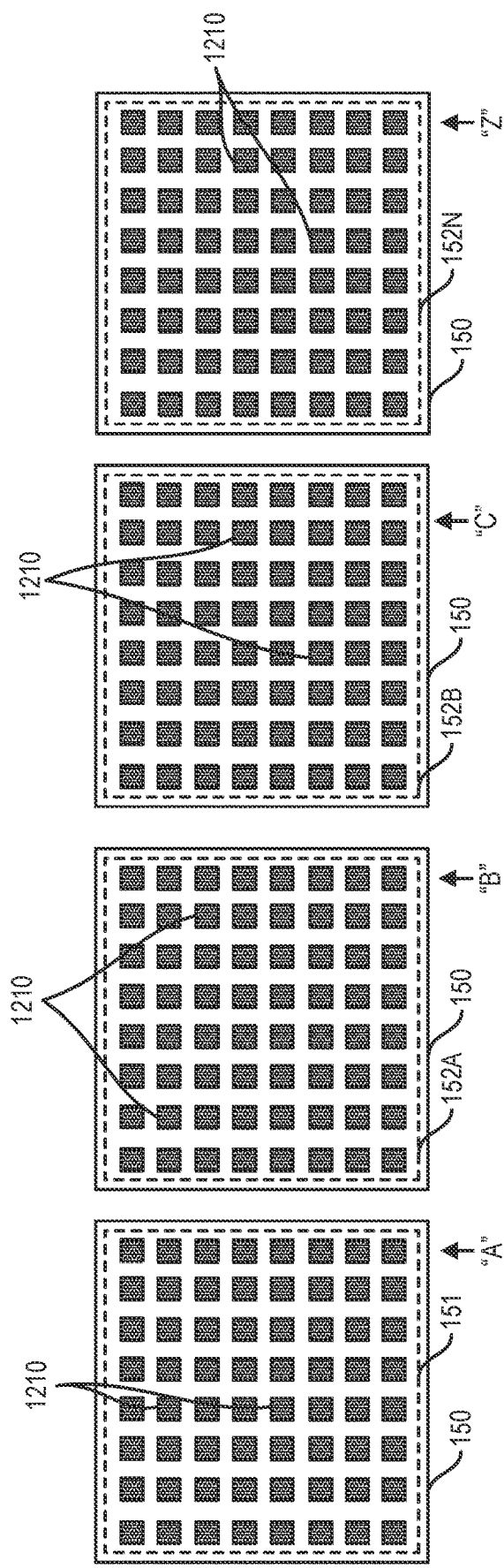
FIG. 7 is schematic diagram of communication node antenna array system according to one embodiment.

In the embodiment of FIG. 7, communication node. e.g., UE device 10A-10Z or a base station 20Z-20Z can include a first antenna array 150 at location "A", a second antenna array 150 at location "B", a third antenna array 150 at location "C", and a fourth antenna array 150 at location "Z". In the embodiment of FIG. 7, the set of scanning antennas configured in a scanning configuration can be provided on antenna array 150 at location "A" and can be defined by the entirety of the antennas of antenna array 150 at location "A". The first to Nth sets of communication antennas in the described embodiment of FIG. 7 can include set of antennas 152A, a set of antennas 152A, set of antennas 152B, and set of antennas 152N. The set of antennas 152A can comprise the entirety of antennas of antenna array 150 at location "B", the set of antennas 152B can include the entirety of antennas of antenna array 150 at location "C", and the set of antennas 152N can include the entirety of antennas of antenna array 150.

It will be understood a number of alternative distribution schemes for distributing the set of scanning antennas and the first to Nth sets of antennas are possible. A certain number of antennas for each respective set of antennas has been indicated. That number can be an arbitrary number from 2 to M. Further, the number of antennas in a given antenna array can be an arbitrary number from two antennas to M antennas. In addition, throughout the deployment period of a communication node 10A-10Z, 20A-20Z the antennas that define the set of scanning antennas and which define the first to Nth sets of antennas configured in a narrow beam communication configuration, can dynamically change. For example, a given set of antennas can be dynamically driven to change from a scanning configuration to a communication configuration and vice versa. Further one or more antenna can be added to a set of antennas to define a new set of antennas. Further one or more antenna can be dropped from a set of antennas to define a new set of antennas.

Embodiments herein can provide for efficient distribution of processing resources. In one aspect, scanning signal receive paths defined by transceiver circuitry 122 of a communication node 10A- 10Z, 20A-20Z can perform methods for detecting and characterization of interfering signals that are not performed in respective communication receive paths. The described distribution of computing resources can conserve signal processing resources as a whole. For example, interference threats can be detected and characterized with performance of interference detection and characterizing methods by a scanning signal receive path without processing resources of communication signal receive paths being consumed by the performance of the same interference detection and characterizing methods. The communication signal receive paths of transceiver circuitry 122 with reduced task loads and task loads more focused on communication tasks can operate faster with reduced power consumption without loss of comprehensive interference detection by a communication node as a whole.

Figure 8:
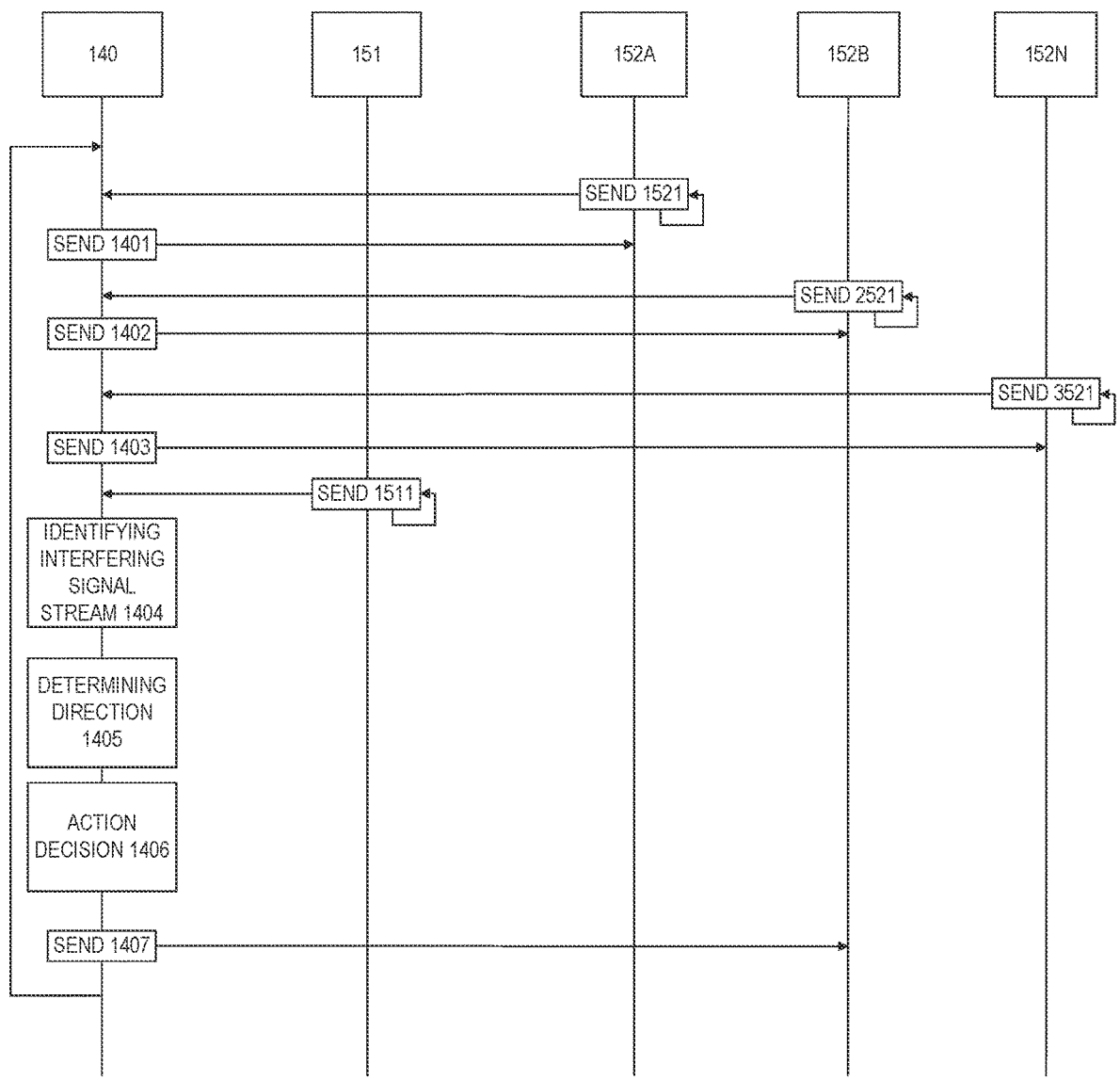
FIG. 8 is flowchart depicting a method for performance by a communication node signal processing circuit interoperating with various sets of antennas according to one embodiment.

A method for performance by signal processing circuit 140 is shown in FIG. 2 of a UE device 10A-10Z or a base station 20A-20Z interoperating with a set of scanning antennas 151 configured in a scanning configuration, and first to Nth sets of antennas 152A, 152B and 152N operating in a communication configuration is set forth in reference to the flowchart of FIG. 8.

As indicated by blocks 1521, 2521, and 3521, signal processing circuit 140 can be iteratively receiving aggregate communication signal streams from first to Nth sets of antennas comprising set of antennas 152A, set of antennas 152B, and set of antennas 152N. As indicated by blocks 1401, 1402, and 1403, signal processing circuit 140 in response to the receipt of the aggregate communication signal streams can be iteratively sending communication signal streams to first to Nth sets of antennas comprising set of antennas 152A, set of antennas 152B, and set of antennas 152N. The sets of antennas 152A, 152B, and 152N can be configured in a communication configuration in which the sets of antennas 152A, 152B and 152N and are optimized for communication quality, e.g., in terms of data rate. Received aggregate communication signal streams received by signal processing circuit 140 can include an aggregate of signal components which can include respective signal streams from one or more communication node.

According to one embodiment, each of the respective sets of communication antennas 152A, 152B and 152N can be configured to be directed in a different direction. For example, with respect to the environment of the radio communication environment 100 of FIG. 1, a set of communication antennas 152A can be directed in the direction of UE device 10Z, a set of communication antennas 152B can be directed in the direction of UE device 10A, and a set of communication antennas 152N can be directed in the direction of UE device 10B, as shown in FIG. 1. In the described scenario, signal processing circuit 140 is disposed within base station 20B as shown in FIG. 1. In another scenario, signal processing circuit 140 can be a signal processing circuit of UE devices 10A-10Z and receive radio frequency signals picked up by set of antennas 151, set of antennas 152, set of antennas 152B, and set of antennas 152N can be radio frequency signals sent by different ones of base stations 20A-20Z.

While iteratively receiving aggregate communication signal streams from set of antennas 152A, set of antennas 152B and set of antennas 152N, signal processing circuit 140 can iteratively be receiving a scanning signal aggregate stream from set of scanning antennas 151 as indicated by block 1511. Set of scanning antennas 151 configured in a scanning configuration can be picking of an aggregate scanning signal stream for processing by signal processing circuit 140. Set of scanning antennas 151, as set forth herein, can be configured in a scanning configuration. The aggregate scanning signal stream can include an aggregate of signal streams from multiple different communication nodes.

At block 1404, signal processing circuit 140 can perform identifying of an interfering signal stream within a received scanning aggregate signal stream received from set of scanning antennas 151. Signal processing circuit 140 for identifying an interfering signal stream can process an aggregate scanning signal stream picked up by a scanning antenna set at one or more of the pickup frequency (RF frequency), or the down-converted baseband frequency. Additionally or alternatively, signal processing circuit 140 for identifying an interfering signal stream can process digital bitstream signal streams produced by demodulation of picked up and down-converted radio frequency signal streams picked up by a set of antennas configured in a scanning configuration. Signal processing circuit 140 can employ synchronization signal processing for detection of communication node transmitted signal streams within an aggregate scanning signal stream.

Different detection methods can be employed for identifying an interfering signal stream within an aggregate scanning signal stream. At block 1404, signal processing circuit 140 can be applying a variety of processing to detect for an interfering signal stream. In one aspect, signal processing circuit 140 can perform spectrum analysis on received signal streams and can flag receive signal streams as being interfering for exhibiting a non-compliant spectral profile. In one embodiment, signal processing circuit 140 at block 1404 can process a digital representation of a received RF signal picked up at a scanning antenna set. Such a digitized version of the analogue RF signal can be provided with use of high sampling rate receiver circuitry. Signal processing circuit 140 using a spectral analyzer can generate a spectral parameter set characterizing the spectral profile of the received RF signal stream. The parameter set can include parameter values for such parameters as, e.g., center frequency, bandwidth, signal to noise ratio, power level, and the like.

Figure 9:
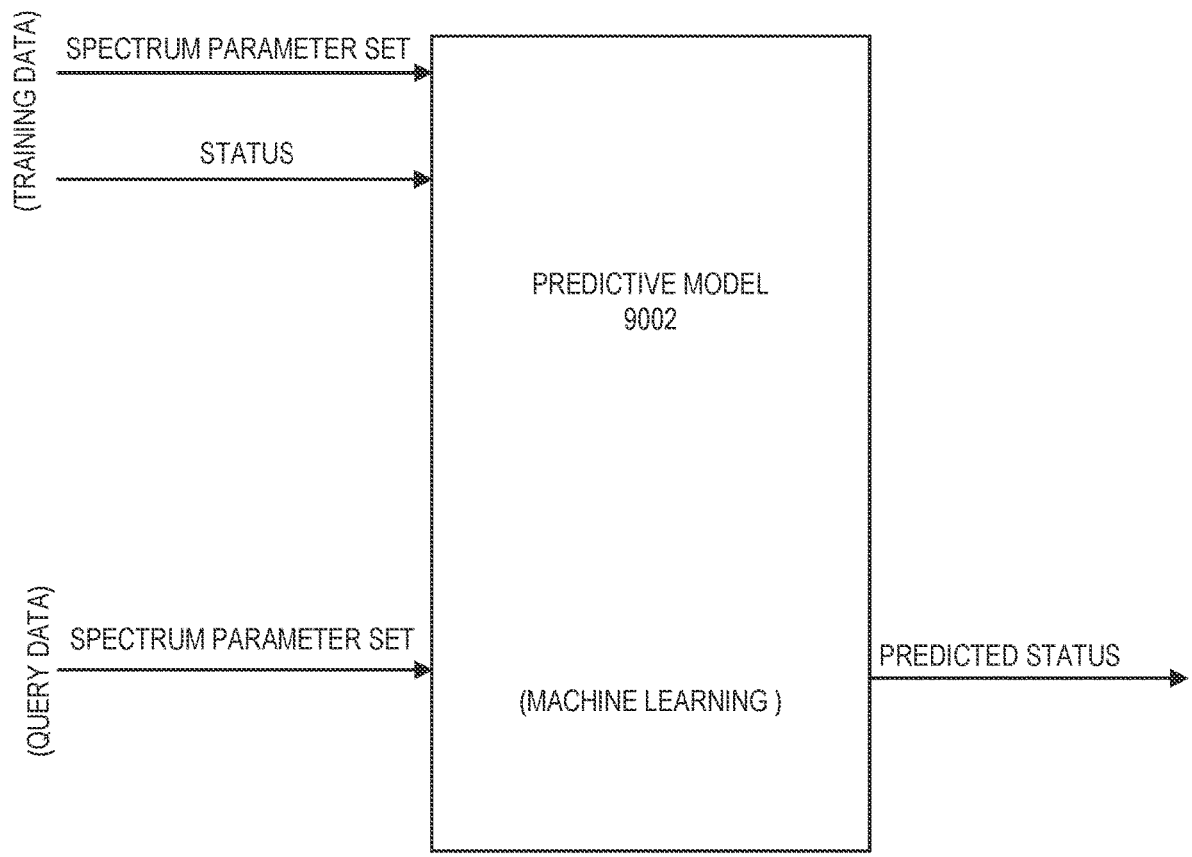
FIG. 9 depicts a predictive model trained by machine learning according to one embodiment.

Signal processing circuit 140 at block 1404 can query predictive model 9002 as shown in FIG. 9 using the extracted spectral parameter set to return a prediction as to the compliant or non-compliant status of the received RF signal stream. Predictive model 9002 as shown in FIG. 9 can be iteratively trained with training data via supervised learning machine learning processes. There can be input as training data into predictive model 9002 iteratively applied training data sets that comprise (a) a spectral parameter set characterizing a spectral profile of the received signal stream, and (b) the compliant or not compliant status of the signal stream. Trained with training data as described, predictive model 9002 can learn to distinguish between compliant and noncompliant signal streams. When new known compliant signal streams are identified, parameter sets characterizing such streams can be input as new training data into predictive model 9002 with compliant profile status parameter values. As new rogue noncompliant interfering signal streams are identified, parameter sets characterizing those signal streams together with a supervised learning noncompliant status parameter value can likewise be input as training data into predictive model 9002 so that predictive model 9002 is further able to detect for the reception of an interfering signal stream.

According to one embodiment, a ground based computing system 40 as shown in FIG. 1 can maintain in data repository 80 an approve/deny list of UE devices authorized to operate within radio communication environment 100 (FIG. 1). The approve/deny list within data repository 80 can include a list of approved and/or not unauthorized communication nodes within radio communication environment 100. The communication nodes on the approve/deny list can be identified with use of computing node identifiers. Signal processing circuit 140 for performance of interfering signal detection using the described approve/deny list can demodulate a down-converted signal stream detected within an aggregate scanning signal stream picked up from a set of scanning antennas.

Embodiments herein recognize that digital bitstream data generated by demodulation of a communication node signal stream can include various unencrypted data including communication node identifier data. For example, the temporary mobile subscriber identity (TMSI) identifier may be an unencrypted form as well as the international mobile subscriber identity (IMSI) identifier. The IMSI is a unique number, usually 15 digits, associated with global system for mobile communication (GSM) and universal mobile telecommunication system (UMTS) network phone mobile phone users. According to the 5G new radio (NR) standard, the radio network temporary identifier (RNTI) may also be provided in unencrypted form.

Signal processing circuit 140 at block 1404 can cross reference extracted communication node identifiers (e.g., TMSI, IMSI, RNTI) extracted by demodulation of a communication node signal stream with respect to the described approve/deny list stored in data repository 80 of ground based computing system 40.

Signal processing circuit 140 can, e.g., query the approve/deny list stored in data repository 80 or alternatively, the ground based computing system 40 can iteratively push the approve/deny list to signal processing circuit 140 for storage into data repository 180. When new communication nodes are approved for participation in radio communication environment 100 by an authority, the identifiers for such communication nodes can be added as approved communication nodes to the approve/deny list of data repository 80 (FIG. 1).

Responsively to the identifying of an interfering signal stream at block 1405, signal processing circuit 140 at block 1406 can perform determining the direction of an identified interfering signal stream.

In its operation, signal processing circuit 140 can be maintaining track of a current direction associated to each respective communication antenna set of its associated communication node using round robin processing. In the operation of communication antenna sets herein, signal processing circuit 140 can control the described communication antenna sets to iteratively transmit handshaking signals, according to a round robin control scheme, at different test beam directions. The handshaking signals can embed a direction tag indicating the beam direction associated to each round robin handshaking transmission. When a receiving communication node receives a handshaking signal, it can return a handshake signal to signal processing circuit 140 with the beam direction tag embedded so that signal processing circuit 140 can record the beam direction that has resulting in successful receipt of a handshaking signal. Communication between communication nodes can then be established using the discovered operational beam direction. Signal processing circuit 140 can be configured so that when communication between signal processing circuit 140 an external communication node is established using a certain communication antenna set with an associated certain beam angle and direction, signal processing circuit can update the dataset of Table A below which can be stored in data repository 180.

TABLE A

| Timestamp | Communication antenna set | Direction | Beam angle | Detected communication nodes |
|---|---|---|---|---|
| T1 | 152A | XX | XX | XX |
| T2 | 152B | XX | XX | XX |
| ... | ... | ... | ... | |
| TN | 152N | XX | XX | XX |
| TN + 1 | 152A | XX | XX | XX |

Referring to Table A, signal processing circuit 140 can iteratively update the dataset of Table A through its deployment period. In addition to recording beam directions and beam angles associated to connected communications, signal processing circuit 140 can update Table A to include identifiers of computing nodes detected by signal processing circuit 140 to be in connection with signal processing circuit 140 via the specified antenna path. In the processing of aggregate communication signal streams associated to a certain communication antenna set, signal processing circuit 140 can, e.g., via synchronization signal processing be detecting communication node signal streams within the aggregate communication signal stream and can be down-converting and demodulating such detected communication signal streams for extraction of digital bitstreams mapping to communication node communication node identifiers (e.g., TMSI, IMSI, RNTI). The updating of the Table A dataset stored in data repository 180 can be highly dynamic especially considering that UE devices 10A-10Z can be mobile and given that antenna assignments to dynamically define scanning and/or communication antenna sets can be dynamically changing.

At block 1404, signal processing circuit 140 can apply a variety of different direction of arrival (DOA) processing techniques to detect a direction associated to a detected interfering signal stream detected within an aggregate scanning signal stream. A variety of different DOA techniques are facilitated by the fact that the same signal stream can be received on multiple different antennas, each having a different respective location on a communication node. Methodologies for determining DOA can include e.g., angle of arrival (AOA), time difference of arrival (TDOA), frequency difference of arrival (FDOA), or combinations of the described methodologies. A TDOA measurement can be made by measuring the difference in the received phase at respectively different antennas. The delay of arrival of a certain signal stream at each antenna can be measured directly or converted into an angle of arrival (AOA) measurement. DOA methodologies employed by signal processing circuit 140 can include processing of signals from a common antenna set as described herein or can include processing of signals picked up on different antenna sets. For example, signal processing circuit 140 for calculating DOA of an interfering signal can examine signals picked up on respectively different antennas that are each located on a certain antenna set defining a scanning antenna set herein or, in another example, a first antenna used in a DOA calculation can be located on a scanning antenna set and a second antenna used in the DOA calculation can be located on a communication antenna set as described herein. In another embodiment, each of the first antenna and second antenna used in a DOA calculation can be included in a communication antenna set, e.g., a common communication antenna set or different communication antenna sets.

Signal processing circuit 140 for performance of block 1404 can alternatively or additionally compare extracted digital bitstream identifiers for communication nodes to the dataset data of Table A in which there is recorded for various communication node identifiers that are associated to certain communication antenna sets at certain times. For detection of a direction associated to a certain communication node that is identified by an extracted identifier, signal processing circuit 140 can locate the most recent instance of the communication node identifier within the dataset of Table A stored in data repository 180 which dataset is produced by processing a signal stream received from communication antenna sets. Embodiments herein recognize that an identifier for a detected interfering signal stream can be extracted by demodulation of a signal stream received from a scanning antenna set and contemporaneously can also be received by demodulation of a signal stream received from a communication antenna set. Signal processing circuit 140 by the described cross referencing of an extracted identifier to the dataset of Table A can determine the direction associated to an interfering signal via lookup of the most recent instance of the communication node identifier within the Table A dataset stored in data repository 180 and the specified beam direction associated to that identifier.

In one embodiment, the processing described with reference to block 1404 and/or block 1405 can be performed with respect to an aggregate signal stream received from a set of scanning antennas. However, in one embodiment signal processing circuit 140 can be restricted from performing the processing of block 1404 and/or block 1405 with respect to aggregate communication signal streams received from respects one of first through Nth sets of communication antennas. In one embodiment, interference detection and DOA processing performed with respect to an aggregate scanning signal stream received from a set of scanning antennas can include processing not performed with respect to an aggregate communication signal stream received from a set of communicating antennas in a communicating configuration. The allocation of additional interference detection and DOA detection processing responsibilities to signal receive path associated to a set of scanning antenna can reduce a burden associated to a communication receive path associated to a set of communication antennas leading to higher data rates with less power consumption. In some embodiments, signal receive paths associated to a set of communication antennas can perform interference detection and/or DOA detection processing, but the processing is not in common with the processing of block 1404 and block 1405 and consumes less processing and memory resources that the processing described with reference to block 1404 and block 1405. In some embodiments, a signal receive path associated to a set of communication antennas can perform processing not performed by a signal receive path associated to a set of scanning antennas. For example, signal receive paths associated to respective sets of communication antennas can perform a first demodulation process for demodulation of a baseband signal optimized for comprehensive application payload data extraction, and a signal receive path associated to a set of scanning antennas can be restricted from performing the first demodulation process. A signal receive path associated to a set of scanning antennas can perform a second demodulation process not performed by the respective signal receive paths associated to the respective sets of communication antennas that is optimized for interference detection. In the described scenario the respective communication and scanning receive paths can be selectively provisioned according to their targeted functions for conservation of computing resources.

At completion of block 1405, signal processing circuit 140 can proceed to block 1406. At block 1406, signal processing circuit 140 can perform an action decision. In action decision block 1406, signal processing circuit 140 can execute machine logic for determination of an action to take in response to identifying interfering signal stream in a direction associated to the interfering signal stream.

According to one scenario, the action decision determined at block 1406 can be the action decision to remove the interfering signal stream. According to one embodiment, removal of an interfering signal stream can include switching off a connection of transceiver circuitry 122 to the set of communication antennas associated to an interfering signal stream so that the interfering signals are not received. Signal processing circuit 140 can identify a set of communication antennas associated to a determined interfering signal stream by cross referencing a determined direction of an interfering signal stream to directional data that is specified in the table A dataset stored in data repository 180. Signal processing circuit 140 can identify a current (most recent) beam direction specified in the Table A dataset matching a determined direction of an interfering signal, and can remove the communication signal stream instance of the interfering signal stream by switching off the communication antenna set having a beam direction matching a determined direction of the interfering signal stream. Embodiments herein recognize that signal processing circuit 140 matching a determined direction of the interfering signal to beam direction of the Table A dataset stored in data repository 180 can include applying an offset factor based on a known relationship between a location of the set of scanning antennas and respective ones of first through Nth sets of communication antennas.

According to one scenario, in reference to the flowchart of FIG. 8, the set of antennas 152B can be directed in the direction of UE device 10A, and UE device 10A can be a UE device operated by an unauthorized entity which can be sending interfering signals that are picked up by set of antennas 152B. In such a scenario, signal processing circuit 140 at block 1404 can identify that an interfering signal stream has been sent and, at block 1405, can determine the direction of the interfering signal stream. On determining the direction of an interfering signal stream, signal processing circuit 140 at block 1406 can reference the dataset of Table A which can associate directions with different sets of communication antennas.

In the described scenario, signal processing circuit 140 at block 1406, referencing the dataset of Table A can determine that set of antennas 152B is associated to the direction determined at block 1406 and can responsibly return the action to remove signal streams associated to the set of antennas 152B.

Accordingly, at block 1407, signal processing circuit at block 1406 can send a communication control signal to switching circuitry associated to set of antennas 152B so that radio frequency signals picked up by set of antennas 152B are not received by signal processing circuit 140. In another embodiment, the switching circuitry for controlling, receiving, or not receiving radio frequency signals picked up by set of antennas 152B can be co-located within signal processing circuit 140.

In response to completion of block 1407, signal processing circuit can return to a stage preceding block 1401 and can iteratively perform the loop of blocks 1401 to 1407 during a deployment period of signal processing circuit 140.

Signal processing circuit 140 at action decision block 1406 in one embodiment can examine interference detection activity levels as well as communication activity levels and can responsively scale the configuration of scanning antenna sets and communication antenna sets respectively. At block 1406 signal processing circuit 140 can produce scores for interference activity level and communication activity level. For providing an interference activity level, signal processing circuit 140 can count the number of distinct interfering signal streams over a specified time to generate value for interference signal stream detection rate. Signal processing circuit 140 can assign scores for interference activity in proportion to the rate of detected interference streams. Signal processing circuit 140 can bias the interference activity score upward in dependence on a rate at which flagged suspicious signal streams are detected. Suspicious signal streams can be streams flagged having some characteristics of interfering streams though they eventually classified as being non-interfering. Embodiments herein recognize that the presence of suspicious streams can indicate a potential threat. For generating a communication activity score at block 1406, signals processing circuit 140 can examine signal streams received from communication antenna sets 152A-152N (FIGS. 5-7).

Signal processing circuit 140 at block 1406 can assign a communication activity score in dependence on a number of communication streams detected as well as data rates associated with those detected streams. For assigning communication activity scores, signal processing circuit 140 at block 1406 can apply a multi-factor formula wherein a first factor is a signal stream factor based on a number of active communication signal streams detected and a data rate factor based on aggregate, e.g., average, data rates associated with the respective active communication signal streams.

At block 1406, signal processing circuit 140 can return action decisions to configure (a) scanning antenna sets and associated signal receive paths and (b) communication antenna sets and associated signal receive paths in proportion to the respective interference activity and communication activity detected at block 1405. For implementing the action of the action decision, signal processing circuit 140 can send appropriate control signals to one or more antenna array 150. Thus, in the case that a severe threat is detected, a large percentage of antennas associated to a communication node can be configured as scanning antenna sets so that a threat imposed by an adversary can be accurately characterized. Similarly, in situations of low interference activity, an increased percentage of antennas available on a communication node 10A-10Z, 20A-20Z together with associated signal receive paths can be configured as communication antenna sets with associated signal receive paths so that resources of the communication node are biased in favor of faster processing of communication stream signals. Referring to FIG. 5, signal processing circuit 140 can, for example, configure set of antennas 152A as a scanning antenna set in the case of an increase in interference activity and in the case of reduced interference activity and increased communication activity can (a) return configuration of antennas 152A to a communication configuration and (b) configure half of the antennas of antenna set as a set of communication antennas.

Signal processing circuit 140 at iterations of the loop of block 1401-1407 at block 1405 can be dynamically increasing or decreasing the allocation of antenna set and signal path resources in dependence on detected interference level activity and communication node activity. In one variation of the described processing wherein scanning resources and communication resources are dynamically adjusted in dependence on detected interference and communication activity levels, signal processing circuit 140 can apply constraints. Signal processing circuit 140, for example, can guarantee the allocation of a minimum number of antennas defining scanning antenna set to be dedicated for interference signal processing, together with associated signal received paths and a minimum number of antennas defining communication antenna sets, together with associated communication signal paths dedicated for processing of communication signal streams.

Various available tools, libraries, and/or services can be utilized for implementation of predictive model 9002. For example, a machine learning service can provide access to libraries and executable code for support of machine learning functions. A machine learning service can provide access set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. According to one possible implementation, a machine learning service can provide access to libraries and a set of REST APIs that can be called from any programming language and that permit the integration of predictive analytics into any application. Enabled REST APIs can provide, e.g., retrieval of metadata for a given predictive model, deployment of models and management of deployed models, online deployment, scoring, batch deployment, stream deployment, monitoring and retraining deployed models. Predictive model 9002 can include use of, e.g., linear regression, curve fitting tools, support vector machines (SVM), Bayesian networks, neural networks and/or other machine learning technologies.

This written description uses examples to disclose the subject matter, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Among the methods and systems set forth herein there is set forth herein as follows: A1. A method comprising: receiving an aggregate scanning signal stream from a set of scanning antennas configured in a scanning configuration; receiving aggregate communication signal streams from first to Nth sets of communication antennas configured in respective communication configurations; identifying an interfering signal stream within the aggregate scanning signal stream and determining a direction associated to such interfering signal stream, wherein the identifying and determining are performed with use of processing of the aggregate scanning signal streams received from the scanning antennas configured in a scanning configuration; and returning an action decision responsively to the identifying and the determining. A2. The method of A1, wherein the action decision is an action decision to remove the interfering stream. A3. The method of A1, wherein the first through Nth sets of communication antennas have respective beam angles less than a beam angle of the set of scanning antennas. A4. The method of A1, wherein the first through Nth sets of communication antennas have respective beam angles less than a beam angle of the set of scanning antennas, wherein respective ones of the first through Nth sets of communication antennas have respective beam angles of about α degrees or less, and wherein the set of scanning antennas has a beam angle of about 2α degrees or more. A5. The method of A1, wherein the action decision is an action decision to remove the interfering signal stream, wherein a first instance of the interfering signal stream is picked up by the set of scanning antennas, wherein a second instance of the interfering signal stream is picked up at a certain set of communication antennas of the first through Nth sets of communication antennas, wherein implementation of the action decision includes determining the certain set of communication antennas at the second instance of the interfering signal stream is picked up and performing an operation so that an aggregate communication signal from the certain set of communication signals is not received. A6. The method of A1, wherein the method includes storing in a data repository parameter values that specify beam directions associated to respective ones of the first through Nth sets of communication antennas, wherein determining a direction associated to such interfering signal stream includes applying DOA processing, wherein the action decision is an action decision to remove the interfering signal stream, wherein implementing the action decision includes identifying the beam direction matching the determined direction of the interfering signal stream, and switching off the certain set of communication antennas associated to the matching beam direction. A7. The method of A1, wherein the method includes storing in a data repository parameter values that specify beam directions associated to respective ones of the first through Nth sets of communication antennas and node identifiers of communication nodes extracted by demodulation of communication node signal streams within the aggregate communication signal streams, wherein the identifying the interfering signal stream includes extracting a communication node identifier by demodulating a communication node signal stream within the aggregate scanning signal stream and cross referencing the communication node identifier to an approve/deny list, wherein the determining a direction associated to such interfering signal stream includes matching the communication node identifier to a stored node identifier stored in the data repository, wherein the action decision is an action decision to remove the interfering signal stream, wherein implementing the action decision includes switching off the certain set of communication antennas associated to the matching node identifier. A8. The method of A1, wherein the action decision is an action decision to remove the interfering stream, and wherein implementation of the action decision includes switching off a communication antenna set of the first through Nth communication antenna sets associated to the interfering stream. A9. The method of A1, wherein the method includes recording into a data repository parameter values specifying current beam directions associated to the first through Nth communication antenna sets. A10. The method of A1, wherein the identifying the interfering signal stream within the aggregate scanning signal stream includes performing interference signal detection processing that is not performed with respect to the aggregate communication signal streams received from the first through Nth communication antennas. A11. The method of A1, wherein the method includes recording into a data repository parameter values specifying beam directions associated to the first through Nth communication antenna sets. Al2. The method of A1, wherein the method includes storing into a data repository parameter values specifying beam directions associated to the first through Nth communication antenna sets, wherein action decision is an action decision to remove the interfering stream, and wherein the method includes using the stored beam directions for implementation of the action decision. A13. The method of A1, wherein the identifying an interfering signal stream within the aggregate scanning signal stream includes querying a predictive model with query data comprising a spectral parameter set, wherein the predictive model has been trained to predict a compliance status in response to applied query data. A14. The method of A1, wherein the identifying an interfering signal stream within the aggregate scanning signal stream includes demodulating a signal stream from the aggregate scanning signal stream to produce a communication node identifier, and cross referencing the communication node identifier to an approve/deny list. A15. The method of A1, wherein the method includes detecting an interference activity using the aggregate scanning stream and dynamically reconfiguring antennas of the first through Nth sets of communication antennas to define a new scanning antenna set in response to the detecting the interference activity. A16. The method of A1, wherein the method includes detecting a communication activity using the first through Nth aggregate communication signal streams and dynamically reconfiguring antennas of the scanning antenna set to define a new communication antenna set in response to the detecting the communication activity. A17. The method of A1, wherein the method includes detecting an interference activity using the aggregate scanning stream and dynamically reconfiguring antennas of the first through Nth sets of communication antennas to define a new scanning antenna set in response to the detecting the interference activity, wherein the method includes detecting a communication activity using the first through Nth aggregate communication signal streams and dynamically reconfiguring antennas of the scanning antenna set to define a new communication antenna set in response to the detecting the communication activity. B1. A system comprising: a signal processing circuit, wherein the signal processing circuit is configured for receiving an aggregate scanning signal stream from a set of scanning antennas configured in a scanning configuration; receiving aggregate communication signal streams from first to Nth sets of communication antennas configured in respective communication configurations; identifying an interfering signal stream within the aggregate scanning signal stream and determining a direction associated to such interfering signal stream, wherein the identifying and determining are performed with use of processing of the aggregate scanning signal streams received from the scanning antennas configured in a scanning configuration; and returning an action decision responsively to the identifying and the determining. B2. The system of B1, wherein the first through Nth sets of communication antennas have respective beam angles less than a beam angle of the set of scanning antennas. B3. The system of B1, wherein the first through Nth sets of communication antennas have respective beam angles less than a beam angle of the set of scanning antennas, wherein respective ones of the first through Nth sets of communication antennas have respective beam angles of about α degrees or less, and wherein the set of scanning antennas has a beam angle of about 2α degrees or more.

It is to be understood that the above description is intended to be illustrative, and not restrictive. For example, the above-described examples (and/or aspects thereof) may be used in combination with each other. In addition, many modifications may be made to adapt a particular situation or material to the teachings of the various examples without departing from their scope. While the dimensions and types of materials described herein are intended to define the parameters of the various examples, they are by no means limiting and are merely exemplary. Any description herein of a particular value without a modifier implicitly encompasses that value modified by the term "about". Further, any description a specific range of values implicitly encompasses a description of all possible particular subranges of the specific range. Many other examples will be apparent to those of skill in the art upon reviewing the above description. The scope of the various examples should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc., are used merely as labels, and are not intended to impose numerical requirements on their objects. Forms of term "based on" herein encompass relationships where an element is partially based on as well as relationships where an element is entirely based on. Forms of the term "defined" encompass relationships where an element is partially defined as well as relationships where an element is entirely defined. Further, the limitations of the following claims are not written in means-plus-function format and are not intended to be interpreted based on 35 U.S.C. § 112(f) unless and until such claim limitations expressly use the phrase "means for" followed by a statement of function void of further structure. It is to be understood that not necessarily all such objects or advantages described above may be achieved in accordance with any particular example. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the subject matter has been described in detail in connection with only a limited number of examples, it should be readily understood that the subject matter is not limited to such disclosed examples. Rather, the subject matter can be modified to incorporate any number of variations, alterations, substitutions or equivalent arrangements not heretofore described, but which are commensurate with the spirit and scope of the subject matter. Additionally, while various examples of the subject matter have been described, it is to be understood that aspects of the disclosure may include only some of the described examples. Also, while some examples are described as having a certain number of elements it will be understood that the subject matter can be practiced with less than or greater than the certain number of elements. Accordingly, the subject matter is not to be seen as limited by the foregoing description, but is only limited by the scope of the appended claims.

The invention claimed is:

1. A method comprising:
receiving an aggregate scanning signal stream from a set of scanning antennas configured in a scanning configuration;
receiving aggregate communication signal streams from first to Nth sets of communication antennas configured in respective communication configurations;
identifying an interfering signal stream within the aggregate scanning signal stream and determining a direction associated to such interfering signal stream, wherein the identifying and determining are performed with use of processing of the aggregate scanning signal streams received from the scanning antennas configured in a scanning configuration; and
returning an action decision responsively to the identifying and the determining.

2. The method of claim 1, wherein the action decision is an action decision to remove the interfering stream.

3. The method of claim 1, wherein the first through Nth sets of communication antennas have respective beam angles less than a beam angle of the set of scanning antennas.

4. The method of claim 1, wherein the first through Nth sets of communication antennas have respective beam angles less than a beam angle of the set of scanning antennas, wherein respective ones of the first through Nth sets of communication antennas have respective beam angles of about α degrees or less, and wherein the set of scanning antennas has a beam angle of about 2α degrees or more.

5. The method of claim 1, wherein the action decision is an action decision to remove the interfering signal stream, wherein a first instance of the interfering signal stream is picked up by the set of scanning antennas, wherein a second instance of the interfering signal stream is picked up at a certain set of communication antennas of the first through Nth sets of communication antennas, wherein implementation of the action decision includes determining the certain set of communication antennas at the second instance of the interfering signal stream is picked up and performing an operation so that an aggregate communication signal from the certain set of communication signals is not received.

6. The method of claim 1, wherein the method includes storing in a data repository parameter values that specify beam directions associated to respective ones of the first through Nth sets of communication antennas, wherein determining a direction associated to such interfering signal stream includes applying DOA processing, wherein the action decision is an action decision to remove the interfering signal stream, wherein implementing the action decision includes identifying the beam direction matching the determined direction of the interfering signal stream, and switching off a certain set of communication antennas associated to the matching beam direction.

7. The method of claim 1, wherein the method includes storing in a data repository parameter values that specify beam directions associated to respective ones of the first through Nth sets of communication antennas and node identifiers of communication nodes extracted by demodulation of communication node signal streams within the aggregate communication signal streams, wherein the identifying the interfering signal stream includes extracting a communication node identifier by demodulating a communication node signal stream within the aggregate scanning signal stream and cross referencing the communication node identifier to an approve/deny list, wherein the determining a direction associated to such interfering signal stream includes matching the communication node identifier to a stored node identifier stored in the data repository, wherein the action decision is an action decision to remove the interfering signal stream, wherein implementing the action decision includes switching off a certain set of communication antennas associated to the matching node identifier.

8. The method of claim 1, wherein the action decision is an action decision to remove the interfering stream, and wherein implementation of the action decision includes switching off a communication antenna set of the first through Nth communication antenna sets associated to the interfering stream.

9. The method of claim 1, wherein the method includes recording into a data repository parameter values specifying current beam directions associated to the first through Nth communication antenna sets.

10. The method of claim 1, wherein the identifying the interfering signal stream within the aggregate scanning signal stream includes performing interference signal detection processing that is not performed with respect to the aggregate communication signal streams received from the first through Nth communication antennas.

11. The method of claim 1, wherein the method includes recording into a data repository parameter values specifying beam directions associated to the first through Nth communication antenna sets.

12. The method of claim 1, wherein the method includes storing into a data repository parameter values specifying beam directions associated to the first through Nth communication antenna sets, wherein action decision is an action decision to remove the interfering stream, and wherein the method includes using the beam directions for implementation of the action decision.

13. The method of claim 1, wherein the identifying an interfering signal stream within the aggregate scanning signal stream includes querying a predictive model with query data comprising a spectral parameter set, wherein the predictive model has been trained to predict a compliance status in response to applied query data.

14. The method of claim 1, wherein the identifying an interfering signal stream within the aggregate scanning signal stream includes demodulating a signal stream from the aggregate scanning signal stream to produce a communication node identifier, and cross referencing the communication node identifier to an approve/deny list.

15. The method of claim 1, wherein the method includes detecting an interference activity using the aggregate scanning stream and dynamically reconfiguring antennas of the first through Nth sets of communication antennas to define a new scanning antenna set in response to the detecting the interference activity.

16. The method of claim 1, wherein the method includes detecting a communication activity using the first through Nth aggregate communication signal streams and dynamically reconfiguring antennas of the scanning antenna set to define a new communication antenna set in response to the detecting the communication activity.

17. The method of claim 1, wherein the method includes detecting an interference activity using the aggregate scanning stream and dynamically reconfiguring antennas of the first through Nth sets of communication antennas to define a new scanning antenna set in response to the detecting the interference activity, wherein the method includes detecting a communication activity using the first through Nth aggregate communication signal streams and dynamically reconfiguring antennas of the scanning antenna set to define a new communication antenna set in response to the detecting the communication activity.

18. A system comprising:
  a signal processing circuit, wherein the signal processing circuit is configured for:
    receiving an aggregate scanning signal stream from a set of scanning antennas configured in a scanning configuration;
    receiving aggregate communication signal streams from first to Nth sets of communication antennas configured in respective communication configurations;
    identifying an interfering signal stream within the aggregate scanning signal stream and determining a direction associated to such interfering signal stream, wherein the identifying and determining are performed with use of processing of the aggregate scanning signal streams received from the scanning antennas configured in a scanning configuration; and
    returning an action decision responsively to the identifying and the determining.

19. The system of claim 18, wherein the first through Nth sets of communication antennas have respective beam angles less than a beam angle of the set of scanning antennas.

20. The system of claim 18, wherein the first through Nth sets of communication antennas have respective beam angles less than a beam angle of the set of scanning antennas, wherein respective ones of the first through Nth sets of communication antennas have respective beam angles of about $\alpha$ degrees or less, and wherein the set of scanning antennas has a beam angle of about $2\alpha$ degrees or more.

* * * * *